United States Patent
Dawidowski et al.

(10) Patent No.: US 12,486,291 B2
(45) Date of Patent: Dec. 2, 2025

(54) STABLE ALKALI AMIDE SOLUTIONS AND PROCESSES FOR PREPARING SAME

(71) Applicant: Albemarle Germany GMBH, Frankfurt am Main (DE)

(72) Inventors: Dirk Dawidowski, Friedberg (DE); Annika Hörberg, Mainz (DE); Uwe Lischka, Frankfurt am Main (DE); Theresa Schmidt, Frankfurt (DE); Johannes Klösener, Kelkheim (DE); Ulrich Wietelmann, Friedrichsdorf (DE); Peter Rittmeyer, Sulzbach/Taunus (DE); Stefan Schnippering, Siegburg (DE)

(73) Assignee: ALBEMARLE GERMANY GMBH, Frankfurt am Main (DE)

( * ) Notice: Subject to any disclaimer, the term of this patent is extended or adjusted under 35 U.S.C. 154(b) by 1131 days.

(21) Appl. No.: 17/258,842

(22) PCT Filed: Jun. 28, 2019

(86) PCT No.: PCT/EP2019/067477
§ 371 (c)(1),
(2) Date: Jan. 8, 2021

(87) PCT Pub. No.: WO2020/011567
PCT Pub. Date: Jan. 16, 2020

(65) Prior Publication Data
US 2021/0371435 A1      Dec. 2, 2021

(30) Foreign Application Priority Data

Jul. 11, 2018  (DE) ................... 10 2018 211 495.1

(51) Int. Cl.
*C07F 1/02*  (2006.01)
(52) U.S. Cl.
CPC ..................... *C07F 1/02* (2013.01)
(58) Field of Classification Search
None
See application file for complete search history.

(56) References Cited

U.S. PATENT DOCUMENTS

| | | | |
|---|---|---|---|
| 4,595,779 A | 6/1986 | Morrison et al. | |
| 5,002,689 A | 3/1991 | Mehta et al. | |
| 5,320,774 A | 6/1994 | Mehta et al. | |
| 5,679,850 A | 10/1997 | Hintze et al. | |

FOREIGN PATENT DOCUMENTS

| | | |
|---|---|---|
| CN | 101486721 A | 7/2009 |
| DE | 19605571 C1 | 2/1997 |
| DE | 3943841 C2 | 7/2000 |
| DE | 100 61 317 C1 | 4/2002 |
| JP | 61-502609 | 11/1986 |
| JP | 2-76885 | 3/1990 |
| WO | 86/03744 | 7/1986 |

OTHER PUBLICATIONS

Machine English translation of Weis et al. (DE 19605571) (Year: 1996).*
Albemarle Brochure, Lithium & Magnesium Amides, 2016, 12 pages.
Annual Report 2001 of the Safety Inspectorate of the Canton of Basel-Landschaft, 2002/40-10; 44 pages; not translated.
Bates, R. B., et al., "Cycloreversions of Anions from Tetrahydrofurans. A Convenient Synthesis of Lithium Enolates of Aldehydes", J. Org. Chem., 37(4), 1972, 560; pp. 560-562 pages.
D.R. Lide, Handbook of Organic Solvents, CRC Press Boca Raton, 1995, 4 pages.
Lithium Topics, Sep. 2002, 17 pages.
Schlosser, M., Organometallics in Synthesis, John Wiley, 1994, pp. 130-133. 5 pages.

* cited by examiner

*Primary Examiner* — Renee Claytor
*Assistant Examiner* — Jennifer C Sawyer
(74) *Attorney, Agent, or Firm* — KDW Firm PLLC

(57) ABSTRACT

The object of the invention are solutions of alkali metal amides $MNR^1R^2$, wherein M is an alkali metal selected from Li, Na, K, Rb, Cs; $R^1$ and $R^2$ independently of one another are linear, branched or cyclic alkyl groups having 1 to 8 C atoms or together are a cycloalkyl radical, the alkali metal amides being present in methyltetrahydropyran or in a solvent mixture containing methyltetrahydropyran, and processes for their preparation.

7 Claims, 2 Drawing Sheets

Figure 1:
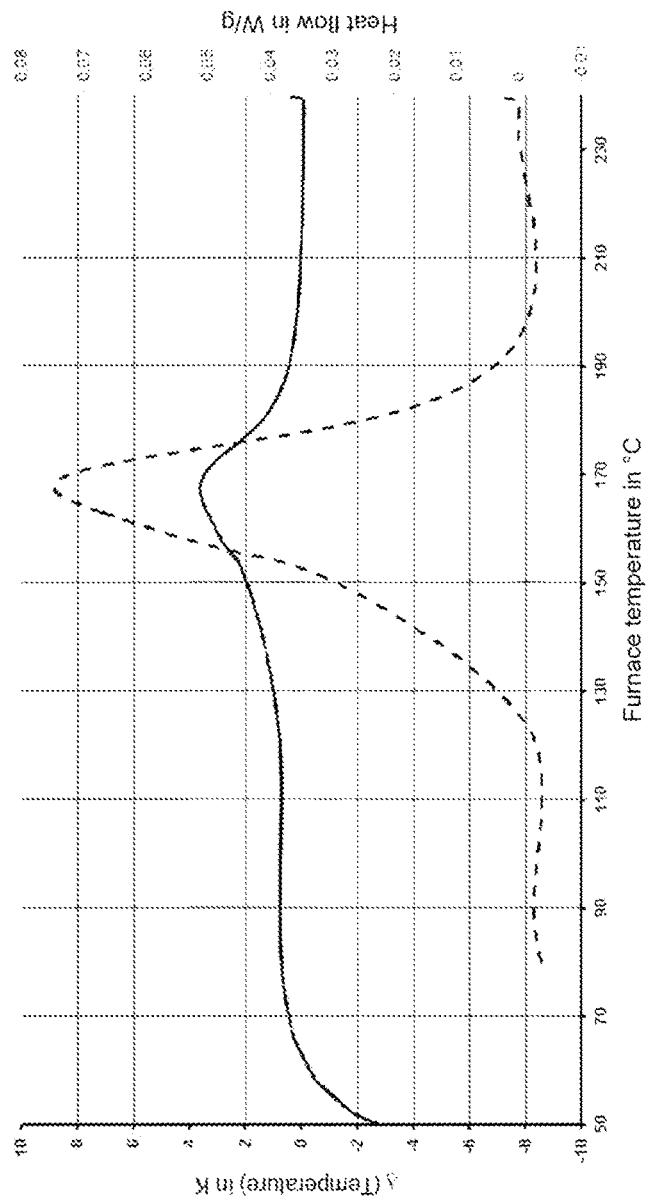

Dynamic RADEX measurement of Li metal in THF Δ Temperatur - continuous line and Heat flow - dashed line.

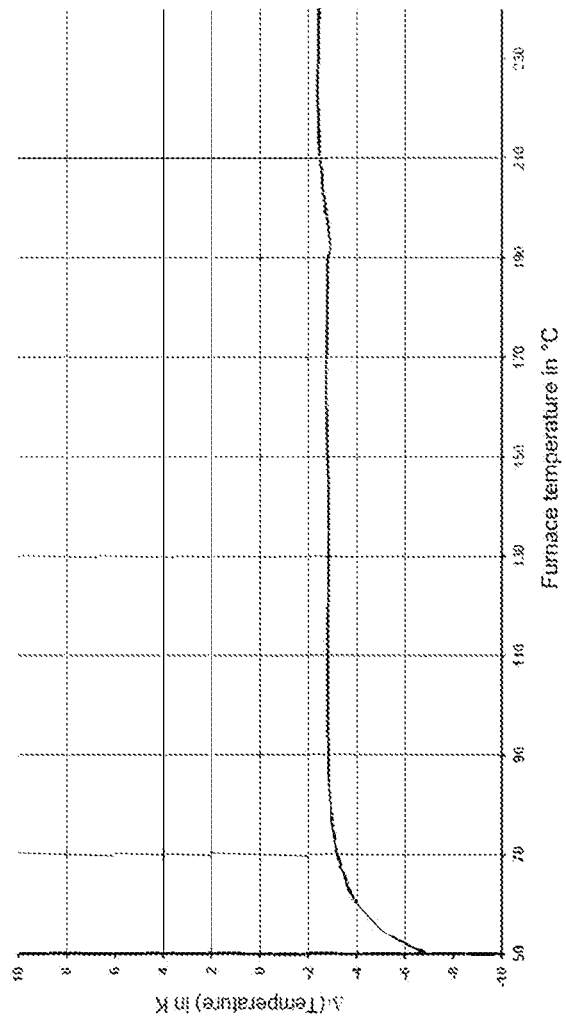
Figure 2: Dynamic RADEX measurement of Li metal in MTH

STABLE ALKALI AMIDE SOLUTIONS AND PROCESSES FOR PREPARING SAME

PRIOR ART

Ether-based solvents are among the most important industrially used process solvents. In numerous organic reactions they are used as solvents due to their good solubility and donor effect.

Besides diethyl ether, cyclic tetrahydrofuran has become established as one of the most important aprotic donor solvents for reactions using saline, basic and organometallic reagents. It has good dissolving properties and is considered to be largely inert. However, ether cleavage must be expected when using stronger nucleophiles. Therefore, solutions of strongly nucleophilic organometallic compounds such as butyllithium in THF are not stable (see M. Schlosser, Organometallics in Synthesis, John Wiley, 1994, 130, or R. B. Bates, J. Org. Chem., 37(4), 1972, 560). Even metal amide bases that are weakened in their nucleophilicity, such as lithium diisopropylamide (LDA), have a limited shelf life as solutions because they decompose under THF cleavage, among other things:

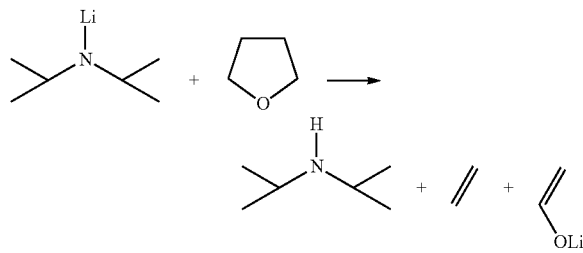

At storage temperatures of 23 or 40° C., they decompose at rates of 0.1 or 0.3% per day (see "Lithium & Magnesium Amides", Technical Brochure of Albemarle 10/2016).

It is also known that base metals such as alkali metals can also react with ether solvents. It is known that the lithium/THF system is not thermodynamically stable, but tends to dangerous decomposition reactions. In 2001, a serious incident occurred at a Swiss company, caused by an uncontrollable decomposition reaction of lithium residues with THF (see Annual Report 2001 of the Safety Inspectorate of the Canton of Basel-Landschaft, 2002/40-10, pages 12-14). DSC (dynamic differential calorimetry) tests show that the system consisting of lithium powder and THF reacts exothermically depending on the lithium concentration from 100-120° C. ("$T_{onset}$"). The decomposition energy released in this process is in the range between 60-80 kJ/mol lithium (see Lithium Topics, September 2002, Technical Information of Chemetall GmbH). According to the general safety standards (see J. Barton, R. Roberts, Chemical Reaction Hazards, Institution of Chemical Engineers, 1997, ISBN 0 95295 341 0, or Th. Grewer's, Thermal Hazards of Chemical Reactions, Industrial Safety Series, Vol. 4, Elsevier 1994, ISBN 0-444-89722-4), the synthesis temperature must not exceed the value of $T_{onset}$-100 K, in this case 0-20° C. On an industrial scale, these low temperatures require a high energy input for cooling and long dosing and reaction times, which in turn leads to correspondingly high production costs.

Problem to be Solved

The problem to be solved by the invention is to provide alkali amide solutions, in particular alkali metal dialkylamides in donor solvents and methods for the safe and inexpensive preparation of strongly basic reagents.

Solution of the Problem

The problem is solved by solutions of alkali metal amides $MNR^1R^2$, wherein M is an alkali metal selected from Li, Na, K, Rb, Cs; $R^1$ and $R^2$ are independently linear, branched or cyclic alkyl groups with 1 to 8 C atoms or together they are a cycloalkyl radical, wherein the alkali metal amides being present in a methyltetrahydropyran or in a methyltetrahydropyran containing solvent mixture.

Preferably M is lithium and $R^1$ and $R^2$ are isopropyl groups. The strongly basic reagent is then lithium diisopropylamide (LDA).

It is particularly preferred that the solvent mixture contains, in addition to 4-methyltetrahydropyran, at least one hydrocarbon which is liquid at room temperature and the molar ratio between the alkali metal amide LDA and 4-methyltetrahydropyran is preferably between 1:0.5 and 1:3.

According to the invention, the preparation is carried out in methyltetrahydropyran or in a solvent mixture containing methyltetrahydropyran, i.e., instead of THF, a solvent with a similarly good solubility but significantly improved stability against alkali metals and metal dialkylamides is used. The molar ratio between metal dialkylamide and methyltetrahydropyran is at least 0.5:1, preferably at least 1:1. A methyltetrahydropyran (MTHP), particularly preferably 4-methyltetrahydropyran (4-MTHP), is used as such solvent. 4-MTHP boils at 105° C. and has only a very low solubility in water (1.5%). In comparison with water-miscible THF, the low water solubility allows convenient product isolation by phase separation processes and the reduction of wastewater quantities. 4-MTHP possesses with μ=about 1.864 D (product information from Kuraray, 17 Aug. 2017) a slightly higher dipole moment than tetrahydrofuran with μ=1.75 D (see D. R. Lide, Handbook of Organic Solvents, CRC Press Boca Raton, 1995, ISNN: 0-8493-8930-5).

Surprisingly, it was found that methyltetrahydropyrans, especially 4-MTHP, have a significantly improved thermal stability against alkali metals and alkali amide bases. This effect comes as a surprise to the expert because methyltetrahydropyrans have at least comparable polarity and thus a similarly strong donicity as THF and contain the same structural elements, i.e. CO bonds that are in principle susceptible to bases, in a ring system.

$R^1$ and $R^2$ are preferably selected from the group consisting of methyl, ethyl, n-propyl, iso-propyl, n-butyl, sec-butyl, isobutyl, tert-butyl, pentyl, neopentyl, hexyl, octyl, decyl, 2-ethylhexyl, cyclopentyl, cyclohexyl. Cyclic amides are preferably metal piperidides, especially the metal 2,2,6,6-tetramethylpiperidide. The metal is preferably selected from lithium and sodium.

In a preferred embodiment, only methyltetrahydropyrans, especially only 4-methyltetrahydropyran, are used as solvents.

Mixtures of at least one methyltetrahydropyran and at least one hydrocarbon solvent are particularly preferred as solvents.

Preferably, aliphatic, cycloaliphatic or aromatic compounds are used as hydrocarbons, either alone or as a mixture of several hydrocarbons.

The hydrocarbon used is at least one compound selected from the group consisting of pentanes, hexanes, heptanes, octanes, decanes, cyclohexane, methylcyclohexane, benzene, toluene, ethylbenzene, xylenes and/or cumene.

As a mixture of several hydrocarbons, the commercially available products, i.e. boiling cuts, are preferably used.

In addition, if a hydrogen acceptor is used for the synthesis, the alkali amide solution according to the invention contains the partially hydrogenated form of this hydrogen acceptor in the amount determined by the synthesis stoichiometry. The hydrogenated hydrogen acceptor is, for example, ethylbenzene when styrene is used or 2-methyl-2-butene when isoprene is used.

The alkali metal is preferably used in powder form or as granules with grain sizes <100 μm or <10 mm, respectively.

Furthermore, the molar ratio between alkali metal and methyltetrahydropyran is preferably 1:0.5 to 1:3.

It is advantageous to add at least one hydrogen acceptor A selected from the group consisting of α-aryl olefins or 1,3-diene with 4 to 12 C atoms during the synthesis reaction.

Especially preferred the hydrogen acceptor A is selected from the group consisting of: styrene, α-methylstyrene, butadiene, isoprene or 1,3-cyclohexadiene and is preferably used in a molar ratio of 0.3 to 0.6:1, based on the amount of amine used.

A process in which the reaction temperature is between 0 and 200° C., preferably 20 to 110° C., is particularly preferred.

The improved stability properties are first demonstrated using the ether solvent/lithium metal system as an example.

For this purpose thermochemical investigations were carried out with the RADEX system of the company Systag/Switzerland. Mixtures of 0.09 g lithium metal powder with a particle size <100 μm and 1.8 g ether solvent were filled into steel autoclaves under argon blanket gas and heated up to a final temperature of 250° C. While the mixture of Li and THF decomposes strongly exothermically from a temperature of about 80° C. (peak temperature 150° C., heat of decomposition −150 J/g), no exotherm is observed in the case of the mixture with 4-MTHP. Instead, a weak endotherm is registered at a furnace temperature of about 190° C., which can be attributed to the melting of the metallic lithium. This means that the lithium metal/4-MTHP system is much more stable and thus allows correspondingly higher process temperatures when lithium and other alkali metals are used.

Surprisingly, similar effects were also observed in the case of mixtures of alkali metal amides with the ethers under consideration. Corresponding measurement results for solutions of lithium diisopropylamide (LDA) in the two ethers are summarized in Table 1. In the case of the THF solutions (comparative tests) two consecutive exothermic events are observed, in the case of the 4-MTHP solutions only one exothermic decomposition step is observed. It can be seen that the beginning of the decomposition reaction ($T_{ONSET}$) in 4-MTHP is shifted about 90 K to higher temperatures. In addition, the heat of decomposition is significantly lower.

The improved thermal stability also affects the storage temperature with a mild temperature increase. This is shown in Table 2:

TABLE 2

Storage stability of LDA solutions in the solvent mixture ether/heptane

| Donor solvent | Molar ratio LDA/donor solvent | LDA concentration (weight %) | Decomposition rate (% per day) at 20° C. | 40° C. |
|---|---|---|---|---|
| THF | 2.0 | 28 | −0.15 | −1.01 |
| THF | 1.1 | 20 | −0.1 | −0.4 |
| 4-MTHP | 1.5 | 20 | −0.02 | −0.04 |

The effects shown on the example of the LDA are also transferable to other alkali metal amides $MNR^1R^2$. The preferred alkali metals are M=lithium, sodium or potassium.

Alkali amides are produced in a similar way to the process known from the use of THF (see U.S. Pat. No. 4,595,779): Either by direct reaction of the alkali metal with a secondary amine in a solvent or solvent mixture containing methyltetrahydropyran according to:

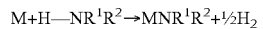

$$M+H-NR^1R^2 \rightarrow MNR^1R^2 + \tfrac{1}{2}H_2$$

or preferably from the alkali metal and a secondary amine in the presence of a hydrogen acceptor A according to:

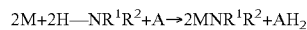

$$2M+2H-NR^1R^2+A \rightarrow 2MNR^1R^2+AH_2$$

where M is an alkali metal selected from Li, Na, K, Rb, Cs; $R^1$ and $R^2$ are independently linear, branched or cyclic alkyl groups having from 1 to 8 carbon atoms or together represent a cycloalkyl radical. The hydrogen acceptor A represents an α-arylolefin or a 1,3-diene with 4 to 12 C-atoms. $R^1$ and $R^2$ are particularly preferred and independently of each other: methyl, ethyl, n-propyl, isopropyl, n-butyl, sec-butyl, isobutyl, tert-butyl, pentyl, neopentyl, hexyl, octyl, decyl, 2-ethylhexyl, cyclopentyl, cyclohexyl. As cyclic amines, piperidine and 2,2,6,6-tetramethylpiperidine are preferred. The preferred hydrogen acceptors are styrene, α-methylstyrene, butadiene, isoprene and 1,3-cyclohexadiene. The hydrogen acceptor is preferably used in a molar ratio of 0.3 to 0.6:1 relative to the amount of amine used. The alkali metal is preferably used either in powder form or as granules with particle sizes <100 μm or <10 mm, respectively. A pure methyltetrahydropyran, preferably pure 4-methyltetrahydropyran, can be used as solvent. However, preferably mixtures of a hydrocarbon, which is liquid at room temperature, and a methyltetrahydropyran are used. The hydrocarbon can be aliphatic, cycloaliphatic or aromatic compounds, either in pure form or as a mixture. Particularly preferred aliphates are: pentanes, hexanes, heptanes, octanes

TABLE 1

Thermal stability (Radex tests) of LDA solutions in the solvent mixture ether/heptane

| Donor solvent | Molar ratio LDA/donor solvent | LDA concentration (weight %) | $T_{onset}$ (° C.) | $T_{max.-1}$ | $T_{max.-2}$ | Decomposition heat (J/g) |
|---|---|---|---|---|---|---|
| THF | 1.1 | 20 | 103 | 128 | 170 | n.b. |
| THF | 1.3 | 20 | 100 | 135 | 174 | −64 |
| 4-MTHP | 1.0 | 21 | 190 | 200 | ./. | −31 |
| 4-MTHP | 1.5 | 22 | 193 | 204 | ./. | −29 | and decanes, preferred cycloaliphatics are cyclohexane and methylcyclohexane, preferred aromatics are benzene, toluene, ethylbenzene, xylenes and cumene. The mixing ratio between methyltetrahydropyran and hydrocarbons can be between 10:1 and 1:10 (the numbers represent weight ratios).

The molar ratio between alkali metal and methyltetrahydropyran is preferably 1:0.5 to 1:3.

Due to the improved thermal stability and safety with regard to an undesired reaction with the solvent associated with the use of methyltetrahydropyrans, the reaction can also be carried out at higher temperatures using liquid alkali metals. The latter process is preferred especially for the low melting alkali metals sodium, potassium, rubidium and cesium.

The reaction temperature is generally between 0 and 200° C., preferably 20 to 110° C.

The alkali metal amide solutions prepared by a process according to the invention in a solvent or hydrocarbon solvent mixture containing methyltetrahydropyran preferably have a concentration of at least 0.3 mol/kg, particularly preferred at least 0.5 mol/kg. The molar ratio between the alkali metal amide and the methyltetrahydropyran is preferably between 1:0.5 and 1:3. A solution of lithium diisopropylamide (LDA) in a mixture of at least one methyltetrahydropyran and at least one hydrocarbon is particularly preferred.

The process products manufactured in accordance with the invention are used as bases in organic synthesis, for example for selective enolization.

The invention is explained in more detail using an example and two figures.

FIG. 1 shows: The thermal behavior (Radex test) of a mixture of 0.09 g Li-powder and 1.8 g THF FIG. 2 shows: The thermal behavior (Radex test) of a mixture of 0.09 g Li powder and 1.8 g 4-MTHP

EXAMPLE 1

Preparation of a 20% solution of lithium diisopropylamide (LDA) in 4-methyltetrahydropyrane/heptane/ethylbenzene 107 g heptane (isomer mixture "Iparsol 7", available from DHC GmbH), 79 g 4-MTHP (supplier Kuraray), 3.45 g lithium granulate (edge length about 3 mm, available from Albemarle) and 50.4 g diisopropylamine (supplier Merck) were placed in an inert, i.e. dry 500 ml glass reactor filled with the blanket gas argon and stirred for one hour at 25° C. Then it was heated up to 30° C. and 26.2 g styrene were added from a dropping funnel within three hours. During the addition, the mixture discolored slightly brownish.

After the end of dosing, the turbid reaction mixture was stirred for another 30 minutes and then filtered through a glass frit. The result was 251 g of a clear yellowish product solution. The active base concentration (thermometry method) was 1.82 mmol/g, resulting in an LDA concentration of 19.5 wt %.

The invention claimed is:

1. Solutions of alkali metal amides $MNR^1R^2$, wherein M is an alkali metal selected from Li, Na, K, Rb, and Cs; $R^1$ and $R^2$ independently of one another are linear, branched or cyclic alkyl groups having 1 to 8 C atoms or together are a cycloalkyl radical, characterized in that the alkali metal amides are present in a solvent mixture containing 4-methyltetrahydropyran and at least one aromatic hydrocarbon compound selected from one or more of benzene, toluene, ethylbenzene, xylene, and/or cumene.

2. Solutions according to claim 1, characterized in that M is lithium, and $R^1$ and $R^2$ are isopropyl.

3. Solutions according to claim 1, characterized in that the solvent mixture contains, in addition to the 4-methyltetrahydropyran, at least one hydrocarbon which is liquid at room temperature and the molar ratio between the alkali metal amide and the 4-methyltetrahydropyran is between 1:0.5 and 1:3.

4. Solutions according to claim 2, characterized in that the solvent mixture contains, in addition to the 4-methyltetrahydropyran, at least one hydrocarbon which is liquid at room temperature and the molar ratio between the alkali metal amide and the 4-methyltetrahydropyran is between 1:0.5 and 1:3.

5. Solutions according to claim 1, characterized in that $R^1$ and $R^2$ are 2,2,6,6-tetramethylpiperidide.

6. Solutions according to claim 1, characterized in that the at least one aromatic hydrocarbon compound is ethylbenzene.

7. Solutions according to claim 1, characterized in that a mixing ratio between 4-methyltetrahydropyran and the at least one aromatic hydrocarbon compound is between 10:1 and 1:10.

* * * * *